Figure 1:
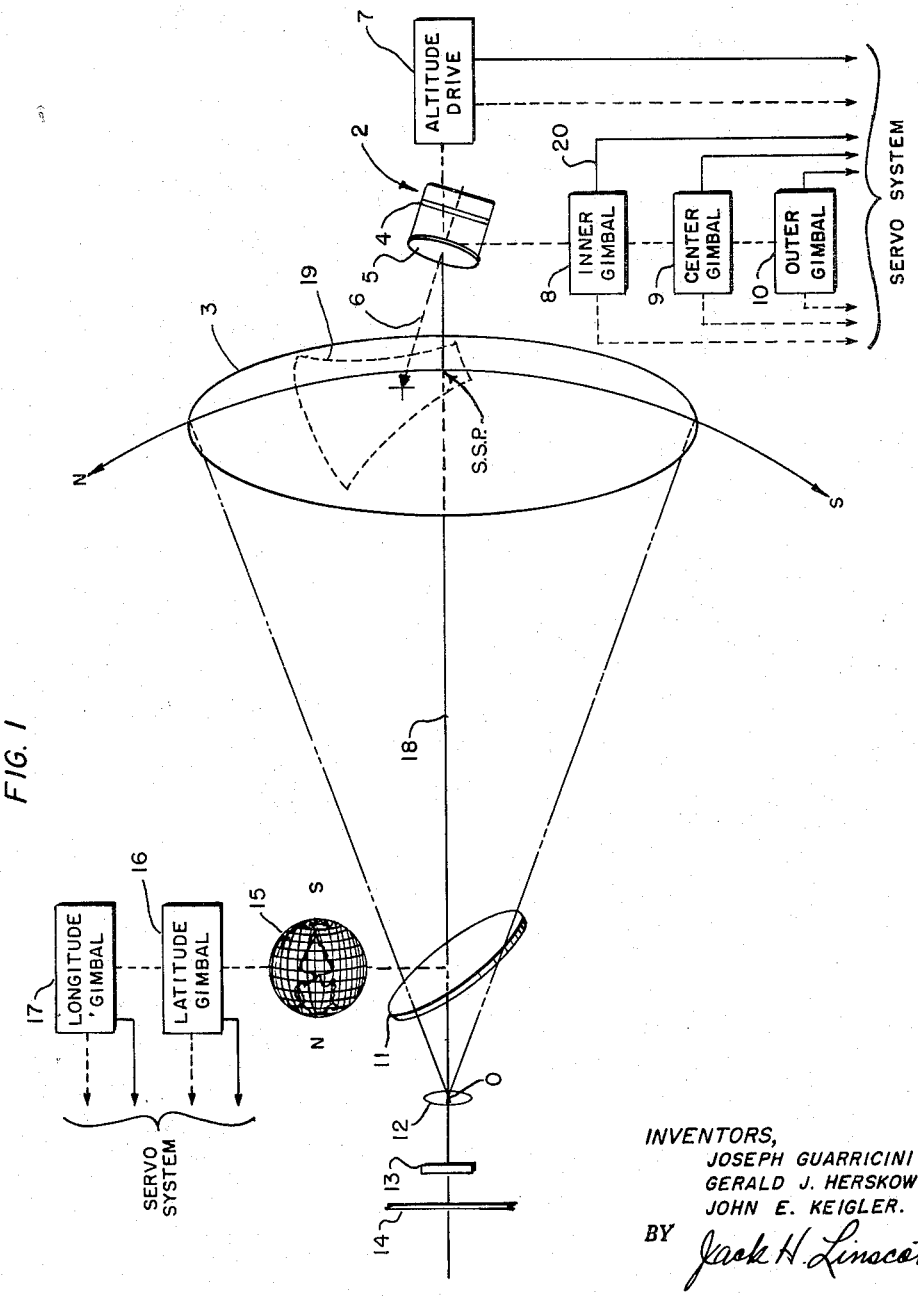

March 27, 1962   J. GUARRICINI ET AL   3,026,765
SATELLITE PICTURE RECTIFICATION
Filed Dec. 13, 1960   2 Sheets-Sheet 1

INVENTORS,
JOSEPH GUARRICINI
GERALD J. HERSKOWITZ
JOHN E. KEIGLER.
BY Jack H. Linscott
ATTORNEY.

INVENTORS,
JOSEPH GUARRICINI
GERALD J. HERSKOWITZ
JOHN E. KEIGLER.
BY Jack N. Linscott

ATTORNEY.

United States Patent Office 3,026,765
Patented Mar. 27, 1962

3,026,765
SATELLITE PICTURE RECTIFICATION
Joseph Guarricini, Trenton, N.J., Gerald J. Herskowitz, Queens, N.Y., and John E. Keigler, Princeton, N.J., assignors to the United States of America as represented by the Secretary of the Army
Filed Dec. 13, 1960, Ser. No. 75,643
4 Claims. (Cl. 88—24)

The present invention relates to a device for rectification of photographs taken by a satellite camera and more particularly to a device which converts oblique earth photographs to orthogonal map representations in the form of gnomonic projections complete with lines of latitude and longitude. The device therefore corrects distortion caused by the oblique viewing of the earth by the satellite camera and modifies each picture to fit a common map co-ordinate system. Further, the device contains automatically positioned elements by means of which the large number of pictures transmitted from a weather satellite, such as Tiros I, may be rapidly and accurately processed.

Pictures taken from satellites are seldom orthogonal views of the earth. If a camera is located on the spin axis of the satellite, for example, the axis and the camera remain oriented in the same direction in inertial space, the direction being that in which the satellite was launched into orbit. Therefore, the optical axis of the camera makes a different angle with respect to the earth at each point in the satellite's orbit. For this reason, if a series of pictures are taken during a single revolution of the satellite about the earth, each one will be taken with a different degree of obliquity with respect to the earth. The present invention provides means by which all of the distortions introduced by this obliquity can be rectified by means of equipment which is adaptable to high speed, assembly line operation.

The equipment comprises a miniature replica of the earth-satellite system in which the portion of the earth over which a particular picture was taken is represented by a dome comprising a section of a sphere made of a translucent material. The satellite picture is projected onto the outside or convex surface of the dome from a projector which is automatically adjustable to a height above the dome proportional to the satellite height and automatically aimed in the same direction as was the satellite camera at the time the picture was made. Simultaneously, the earth lines of latitude and longitude and the continental outlines of that section of the earth represented by the spherical section are projected onto the back or concave surface of the dome by means of a rotatable globe. A camera with its first nodal point at the center of curvature of the spherical section and its optical axis intersecting the center of the spherical surface photographs the composite image on the spherical section, and the result is a gnomonic projection with the point of tangency at the satellite sub-point (point on earth directly below the satellite). A keyboard operated servo system is provided to position the projector and globe to the proper positions.

Figure 2:
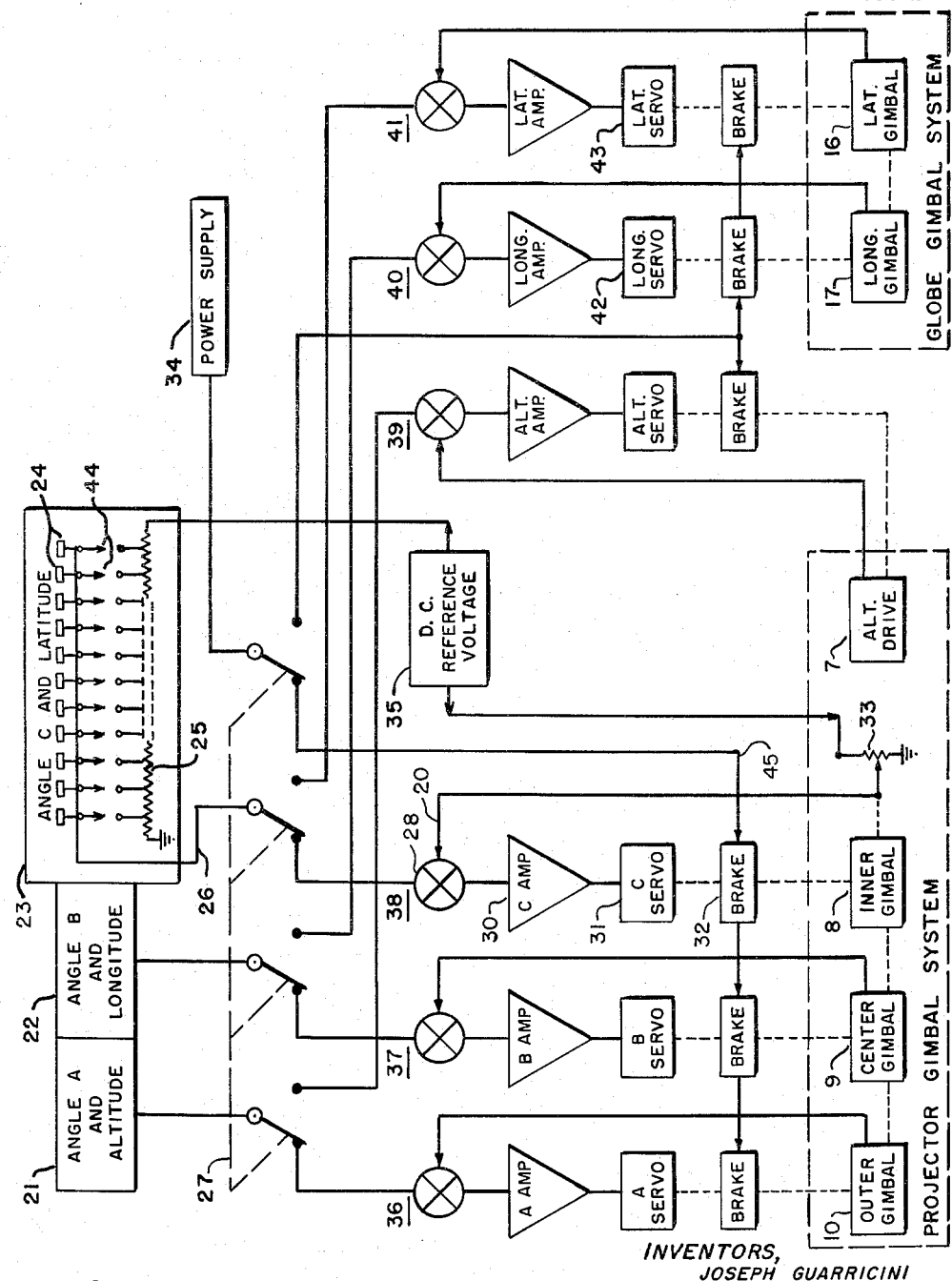

The objects and advantages of the invention will be better understood from the following detailed description and the drawings, which illustrate a preferred embodiment of the invention:

FIG. 1 is a diagram of the rectification device and FIG. 2 is a block diagram of the control circuitry used in the device.

In FIG. 1 the dome 3 is formed in the shape of a section of a sphere, the center of the surface being designated S.S.P. (satellite sub-point). The lines of latitude and longitude and the continental outlines are projected onto the inside or concave surface of the dome by means of the globe 15, which contains a point source of light at its center, and a disc-shaped semi-reflector 11 set at a 45° angle to the dome axis 18. The term "dome axis" as used herein refers to the line joining the center of curvature, O and the center of the spherical surface, S.S.P. In order that the globe image match the curvature of the dome, the length of the light path from the globe's lamp to the dome must be made equal to the radius of curvature of the dome, thereby effectively placing the globe at the center of curvature O of the dome. The globe is generally opaque with the desired information inscribed thereon in the form of transparent lines. The globe is rotatable about a dual concentric gimbal system 16 and 17 by means of which the image of any point on the globe may be made to coincide with the center of the dome, S.S.P. The structural details of such a gimbal system are well known and form no part of the present invention and therefore are indicated in block form only. The longitude gimbal 17 rotates the globe about an axis through the north and south poles by means of longitude servo motor 42 in FIG. 2. The servo motor positions the globe in accordance with data fed to a keyboard contained in box 22. Similarly, the latitude servo 43 rotates the globe about an axis which passes through the globe's equator and center. In the control system of FIGS. 1 and 2 electrical connections are indicated by solid lines and mechanical connections by dashed lines.

The satellite picture 4 is projected onto the outside or convex surface of the dome from a projector 2. The projector is automatically positioned by the control system in the same manner as is the globe, except that a triple concentric gimbal system is required to orient the projector to duplicate the orientation of the satellite camera. Also an altitude drive system 7 is provided to move the projector along the dome axis 18 to locate it at a distance from the dome proportional to the satellite altitude. In order to re-create all angles and distances in the proper proportion the first nodal point of the projector lens 5 must lie at the intersection of the three gimbal axes. The line 6 represents the optical axis of the projector and the dashed outline 19 represents the outline of a satellite picture which has been projected onto the dome. The three angles to which the projector gimbals 8, 9 and 10 must be adjusted have been arbitrarily denominated as A, B and C and a servo channel is provided for each.

The camera is represented by a lens 12, filter 13 and film 14. The optical axis of the camera coincides with the axis 18 of the dome and the first nodal point of the lens system is made to coincide with the center of curvature of the dome, O. With this positioning of the camera, the radial rays from the dome converge on the first nodal point and emerge from the rear nodal point with their angles with respect to axis 18 unchanged. Thus the camera lens projects the composite image of the spherical surface onto the flat film with the rays properly arranged to form a gnomonic projection on planar film 14 with the point of tangency at the center of the dome.

The dome must be of a material which combines high surface diffusion with high light transmission, i.e., it must be translucent. The dome may be made, for example, of clear plastic or glass ground with emery. The camera filter 13 is so constructed that it provides gradually reduced light transmission toward its center but passes light unattenuated near its edges, to compensate for the higher light intensity from the projector image at the center of the dome. The projector image intensity falls off toward the edges of the dome due to the inverse square law and also due to reduced diffusion caused by the reduced angle of incidence of light near the dome edges.

The control system provides a separate servo channel 36, 37, 38, 40 and 41 for each of the five gimbals and one for the altitude drive 39. Three keyboards are contained in the elements 21, 22 and 23 and are alternately connectable via four pole switch 27 to groups of three servo channels, so that three of the six servo channels may be operated simultaneously. The operation of all servo channels is the same and the operation of the C channel which positions the inner gimbal 8 of the projector will be explained in detail. A keyboard 24 is contained in element 23. The key contacts 44 are normally disengaged from the corresponding taps on voltage divider 25. A D.C. reference voltage is applied to the right-hand end of 25 from element 35. The angle C to which the inner gimbal 8 is to be set is determined from previously calculated data concerning the satellite orbit and the key corresponding to this figure is depressed, thereby feeding a voltage to line 26 which is proportional to the desired angle. The servo motor 31 drives the inner gimbal 8 through brake 32 which is held disengaged by the voltage fed over line 45 from power supply 34. As the gimbal 8 moves it operates the movable arm of follow-up potentiometer 33, which is fed the same D.C. reference voltage as is fed to 25. Difference circuit 28 receives the voltage from the keyboard over line 26 and from the follow-up potentiometer over line 20 and feeds the algebraic difference of these two signals to the C amplifier, which drives the C servo motor 31. The servo motor 31 drives the inner gimbal until the output from the follow-up potentiometer equals that of the keyboard, at which point the input to the C amplifier 30 will be zero, and the servo motor therefore de-energized. Inner gimbal 8 is now positioned at angle C. It should be noted that elements 21 and 22 also contain keyboards similar to 24 and all of the servo channels contain follow-up potentiometers but these have not been illustrated. Therefore, with the four-pole switch 27 in the position shown all three projector gimbals can be simultaneously adjusted. When the switch 27 is transferred to the right-hand contacts the three keyboards are connected to the three right-hand servo channels 39, 40, and 41. Simultaneously the power supply 35 is switched from the three left-hand brakes to the three right-hand ones, thereby locking the gimbals which have already been adjusted and freeing the rest for movement.

After all adjustments have been made the two images should coincide on the dome, i.e., the geographical features as projected from the globe should match those from the satellite picture.

The satellite pictures are coded to indicate the time of exposure, therefore it is a simple matter to determine the satellite sub-point for any individual picture from the known orbital data of the satellite. This information determines the proper setting of the globe. In order to calculate the angles A, B, and C, the satellite camera orientation with respect to the earth is first determined at a known point in time and this information can be used to predict the satellite camera orientation at any later time, assuming that the satellite axis and camera remain fixed in the same direction in space. The orientation of the satellite camera may be known when the satellite goes into orbit, however, if this is not the case the present equipment can be used to determine this information in the following manner. A satellite picture is chosen which contains an identifiable landmark which also appears on the globe 15. The globe is then adjusted so that the satellite sub-point for that particular picture falls at S.S.P. The image of the satellite picture from projector 5 is then moved by trial and error over the surface of the dome 3 until the landmark from the globe and from the picture coincide. The orientation of the projector will then match that of the satellite camera when the picture was made, and this information can be used to calculate the proper values of A, B, and C for use with subsequently made pictures. If the satellite camera optical axis is not fixed in space because the camera is located at the periphery of a spinning satellite or the satellite is tumbling the calculations become more involved, but are accomplished in the same general way.

It is obvious that the disclosed device provides a means by which satellite pictures may be quickly and accurately converted in gnomonic map representations. Such a device is essential to the proper utilization and cataloging of the great many pictures which are transmitted from surveillance and weather satellites.

While the invention has been described in connection with a particular embodiment it should be understood that the device is subject to many modifications. Accordingly, the invention should be limited only by the scope of the appended claims.

What is claimed is:

1. A device for converting oblique satellite pictures of the earth to orthogonal maps, said device comprising a translucent spherical surface, means to project said pictures onto the outside of said spherical surface from a point above the center of said spherical surface proportional to the altitude at which said satellite picture was made, means for orienting the projector in the same direction as was the satellite camera, means to project lines of latitude and longitude and continental outlines onto the inside of said spherical surface, said last named means comprising a globe with a point source of light at its center and a semi-reflector set at a 45 degree angle with respect to the axis of said spherical surface, means to rotate said globe to a point at which its image on the spherical surface coincides with that of the said satellite picture, a camera with its optical axis co-linear with that of the said spherical surface and its first nodal point located at the center of curvature of said spherical surface.

2. A satellite picture rectification device comprising a translucent dome of spherical shape, a projector adapted to project said satellite picture onto the outside of said dome, a keyboard operated servo system for positioning said projector to duplicate the angle and altitude from which said satellite picture was made, an illuminated globe arranged to project the lines of latitude and longitude and the continental outlines of that section of the earth represented by the dome onto the inside of said dome, and a camera positioned with its first nodal point at the center of curvature of the dome and its optical axis co-linear with the dome axis.

3. The method of converting oblique satellite pictures into gnomonic projections comprising the steps of projecting an image of the earth lines of latitude and longitude and continental outlines onto the inside surface of a translucent spherical surface, projecting the image of a satellite picture onto the outside surface of said spherical surface, positioning the image of said satellite picture so that the geographical features of the two images coincide to form a composite image, and photographing the composite image with a camera with its first nodal point at the center of curvature of the spherical surface and its optical axis co-linear with that of said spherical surface.

4. A satellite picture rectification device for correcting distortion in satellite pictures with varying degrees of obliquity, comprising a translucent spherical surface, an adjustably mounted projector arranged to project a satellite picture onto the outside of said spherical surface, means to adjust said projector to duplicate the altitude and angle from which said satellite picture was taken, means to project the lines of latitude and longitude and the continental outlines of the area represented by said satellite picture onto the inside of said spherical surface, and a camera with its first nodal point at the center of curvature of said spherical surface and its optical axis co-linear with the axis of said spherical surface, whereby said rectification device represents a miniature replica of the earth-satellite system.

References Cited in the file of this patent

UNITED STATES PATENTS

| | | |
|---|---|---|
| 1,833,548 | Aldis | Nov. 24, 1931 |
| 1,945,926 | Tolhurst | Feb. 6, 1934 |
| 2,379,894 | Esval et al. | July 10, 1945 |
| 2,736,230 | Domeshek | Feb. 28, 1956 |

FOREIGN PATENTS

| | | |
|---|---|---|
| 598,712 | Germany | June 18, 1934 |